United States Patent Office 2,924,578
Patented Feb. 9, 1960

2,924,578

PREVENTING SCALE FORMATION IN SLURRY FEEDING PROCESSES BY MEANS OF A MIXTURE OF AMMONIA AND CARBON DIOXIDE

Frank E. Guptill, Jr., Whittier, Calif., assignor to Texaco Inc., a corporation of Delaware No Drawing. Application November 15, 1956
Serial No. 622,285

10 Claims. (Cl. 252—373)

The present invention relates to improvements in the process for treating solid particles such as minerals which involves first forming a flowable mixture of solid particles in a vaporizable liquid, and then passing the mixture through an elongated tubular heating zone while heating the mixture to vaporize the liquid and form a dispersion of solid particles in vapor. Such treating is employed in a recently developed fluid energy grinding process, as described in U.S. Patent 2,735,787. It is also employed for feeding particles of a solid material to a reaction, e.g. coal to a synthesis gas generator as described in U.S. Patent 2,864,677, granted December 16, 1958, even with little or no concomitant grinding.

This invention is directed primarily to preventing or reducing the accumulation of scale in tubular heating zones during such feeding operations, and is related to application Ser. No. 622,286, filed concurrently herewith by Chapman and Dille, entitled Preventing Scale Formation in Slurry Feeding Processes by Means of a Mixture of Alkaline Hydroxide and Carbonate. This beneficial result is obtained by incorporating in the flowable mixture of solid particles and vaporizable liquid both of the compounds ammonium hydroxide and ammonium carbonate, as described in said application, but modified by introducing ammonia and carbon dioxide into the mixture to form such compounds in situ instead of directly adding the compounds. Dissolved scale-forming compounds are in this way precipitated as insoluble compounds which then pass through the heating zone as solids instead of depositing on tube walls during vaporization.

In the grinding and feeding processes to which the present improvement relates, after forming a dispersion of solid particles in steam or other vapor as described above, it is passed through a succeeding zone of high velocity flow wherein the flowing stream is subjected to turbulence and a velocity sufficiently high to effect disintegration of the coarse particles. Velocity should exceed 25 feet per second, but is usually much higher, such as hundreds or even thousands of feet per second. This succeeding zone may be a section of pipe, or may include a convergent-divergent nozzle or a pair of opposed jet nozzles. Then the resulting stream containing finely ground solids in suspension is discharged from the high velocity zone. When grinding is the ultimate purpose, the ground product is recovered. When gasification of coal is to be performed, the discharged coal particles are fed to a suitable gasifier for combustion and gas generation.

Water will be described as the suspension liquid hereinafter to exemplify the invention. However, other liquids also may be used such as kerosene, alcohols, glycols, carbon tetrachloride and the like.

Much of the development work on the foregoing operations has involved the treating of mineral materials which contain soluble ingredients tending to form a scale on the internal walls of the heated tubes when liquid is evaporated from the flowable mixture. Among such scale forming ingredients are certain compounds of calcium, aluminum, silicon, sulphur, iron and magnesium, which dissolve in the suspension liquid and later precipitate in the heater tubes after the liquid has vaporized. Examples are calcium sulfate and bicarbonate.

Scale is detrimental because it causes the tube passages to become so constricted that the velocity rises to a rate high enough to erode through the tube walls. Also, when scale reduces the internal diameter of the tubes it is difficult to maintain constant operating conditions of pressure, velocity, and flow rate during the treating operation. Reduced passage size also imposes overloads on feed pumps, which must operate against excessive back pressures.

Particular difficulty has been experienced when treating talc and coal, both of which may contain sulfur and/or iron compounds, as well as silicious and bicarbonate materials. An examination of the scale in the coal feeding portion of a coal gasifying plant has shown that it is largely a calcium sulfate deposit together with coal, silica, and compounds of iron and/of aluminum. An analysis of the scale in a talc grinding plant has indicated that an initial portion of the tubular zone the scale is almost all calcium sulfate and calcium carbonate, but from there on the proportion of sulfate scale progressively decreases and the proportion of silicious scale increases. Such silicious scale from a talc grinding plant, upon examination, revealed that it was composed of alternating white and grey layers, and that these layers were made up of steatite, grammatite, alpha quartz, alpha cristobalite, and other unknowns. Chemican analysis indicates talc, silica, iron and/or aluminum.

In carrying out the present invention, substantially anhydrous ammonia and carbon dioxide are added to a flowable mixture in any desired way. One suitable procedure is to blow the gases into the bottom of a pool of slurry contained in a large tank so that the flowing gases rise and agitate the slurry to assist in suspending the solid particles in water while at the same time precipitating the scale-forming compounds in the tank. Alternatively, the ammonia can be supplied to the slurry as a liquid, but even then vaporizes rapidly while going into solution.

Due to its greater water solubility it is usually advantageous to start the flow of ammonia well before the start of carbon dioxide flow. In this way, the presence of excess ammonium hydroxide to react with relatively insoluble carbon dioxide and continuously form the carbonate is assured. An additional benefit flowing from this procedure is that the dissolved calcium bicarbonate is converted to insoluble carbonate, whereas it tends to remain in solution otherwise and may later precipitate as scale in the heater tubes.

An alternative procedure is to bleed one or both of the ammonia and carbon dioxide into makeup water as it flows to the slurry tank.

The ammonium compounds formed in situ by my process have a distinct advantage over the sodium compounds of the aforementioned Chapman and Dille application in that sodium compounds attack the refractory lining in a synthesis gas generator when feeding coal thereto from a slurry grinding coil. When using ammonium carbonate and ammonium hydroxide produced in situ as substitutes for the sodium compounds, however, this problem is eliminated completely.

Ammonia and carbon dioxide are beneficial in any amount, but normally it is advantageous to incorporate at least ½ pound total of both materials, per ton of water, and at most about 20 pounds per ton of water. More may be used successfully, although the improvement obtained may not be directly proportional to increase in the quantities of materials above this figure. The proportion of ammonia to carbon dioxide is not highly critical. However, it is desirable not to use ammonia in excess of the stoichiometric amount required to react with bicarbonate in the slurry water because the excess tends to react with silica in the solid particles to produce a water soluble silicate which may subsequently be deposited in the heater coil as a silicate scale.

In order to be sure that the proper amount of ammonia is used, the pH of the slurry should be adjusted to between 9 and 10, preferably about 9. At pH below 9 all the bicarbonate will not have been reacted; and at pH above 10 there is danger of getting into the silica leach range. For example, the addition of 35 pounds of ammonia along with 10 pounds of carbon dioxide to 6000 gallons of 50% by weight coal slurry will reduce the hardness from 600 p.p.m. down to 8 p.p.m.. The amount of ammonia can be reduced to as little as 14 pounds per 6000 gallons while still lowering the hardness to the same value or less.

Example

Fifty tons of a talc-water slurry containing 50% by weight of minus 200 mesh talc are prepared in a large tank. Upon analysis the water is found to have a total hardness of 600 p.p.m. expressed as calcium carbonate, and a temporary hardness of 120 p.p.m. expressed as calcium bicarbonate.

To this slurry are added 34 pounds of gaseous ammonia and 33 pounds of gaseous carbon dioxide, after which the total hardness is only 10 p.p.m. as the result of the precipitation of most of the hardness-forming materials in the slurry tank.

The slurry is then pumped at 505 pounds per square inch through 400 feet of coiled ½ inch extra heavy iron pipe at a rate of 935 pounds per hour. The temperature at the outlet of the pipe is 900° F. and the pressure at the outlet is 32 pounds per square inch. The resulting ground talc product has a median particle size of 4 microns. No difficulty with scale formation is encountered.

Obviously, many modifications and variations of the invention, as hereinbefore set forth, may be made without departing from the spirit and scope thereof, and therefore only such limitations should be imposed as are indicated in the appended claims.

I claim:

1. In a process for treating particles of a solid material which includes ingredients tending to form a detrimental scale at a heating coil, said process comprising forming a flowable mixture of particles of said solid material in vaporizable liquid, passing said mixture into and through an elongated tubular heating zone, and heating said mixture during passage through said heating zone to vaporize said liquid and form therein a flowing dispersion of solid particles in vapor: the improvement which comprises, introducing into said flowable mixture a small quantity of both ammonia and carbon dioxide to reduce scale formation within said heating zone.

2. In a process in accordance with claim 1, at least part of said ammonia being introduced before said carbon dioxide.

3. In a process in accordance with claim 1, said solid material being selected from the group consisting of coal and talc.

4. In a process in accordance with claim 1, said solid material being talc, and said process including grinding said talc by passing said flowing dispersion in high velocity turbulent flow.

5. In a process in accordance with claim 1, said solid material being coal, and said process also comprising feeding said dispersion into a gasification zone, and oxidizing ingredients of said coal therein to produce synthesis gas.

6. In a process in accordance with claim 1, said ammonia and carbon dioxide being introduced in total amount up to 20 pounds per ton of liquid in said flowable mixture.

7. In a process in accordance with claim 1, said vaporizable liquid being water, and said ammonia and carbon dioxide being added in an aggregate amount between ½ and 20 pounds per ton of water in said flowable mixture.

8. In a process in accordance with claim 7, between about 10 and 35 parts by weight of ammonia being added per 10 parts by weight of carbon dioxide.

9. In a process for treating particles of a solid material which includes ingredients tending to form a detrimental scale in a heating coil, said process comprising forming in a tank a slurry of particles of said solid material in water, passing said slurry into and through an elongated tubular heating zone, and heating said slurry during passage through said heating zone to vaporize said liquid and form therein a flowing dispersion of solid particles in steam: the improvement which comprises, introducing into said slurry in said tank both ammonia and carbon dioxide to agitate said slurry and assist the suspension of solid particles therein, and to reduce scale formation within said heating zone.

10. In a process for grinding coarse particles of a solid material which includes ingredients tending to form a detrimental scale in a heating coil, said process comprising forming a slurry of coarse particles of said solid material in water, passing said mixture into and through an elongated tubular heating zone, heating said mixture during passage through said heating zone to vaporize said water and form therein a flowing dispersion of solid particles in steam, and passing said dispersion through a succeeding zone of high velocity flow while subjecting the flowing stream therein to turbulence and a high velocity sufficient to effect disintegration of said coarse particles: the improvement which comprises, introducing into said slurry a small quantity of both ammonia and carbon dioxide to reduce scale formation within said heating zone.

References Cited in the file of this patent

UNITED STATES PATENTS

| | | |
|---|---|---|
| 1,263,532 | Cummings | Apr. 23, 1918 |
| 2,038,316 | Rosenstein | Apr. 21, 1936 |
| 2,106,196 | Fitch | Jan. 25, 1938 |
| 2,182,286 | Doennecke et al. | Dec. 5, 1939 |
| 2,350,111 | Hood | May 30, 1944 |
| 2,735,787 | Eastman et al. | Feb. 21, 1956 |
| 2,787,326 | Hughes | Apr. 2, 1957 |